(12) United States Patent
Segawa

(10) Patent No.: US 6,598,147 B1
(45) Date of Patent: Jul. 22, 2003

(54) DATA PROCESSING DEVICE AND METHOD

(75) Inventor: Reiji Segawa, Nagaokakyo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/674,409

(22) PCT Filed: Apr. 26, 2000

(86) PCT No.: PCT/JP99/02196

§ 371 (c)(1),
(2), (4) Date: Feb. 28, 2001

(87) PCT Pub. No.: WO99/57642

PCT Pub. Date: Nov. 11, 1999

(30) Foreign Application Priority Data

May 1, 1998 (JP) ............................................. 10-122189

(51) Int. Cl.[7] .......................... G06F 12/10; G06F 12/08; G06F 15/82
(52) U.S. Cl. .......................... 712/26; 712/233; 711/128; 711/207; 711/205
(58) Field of Search ................................. 712/233, 225, 712/201, 26, 25; 711/128, 205, 206, 207, 208, 209, 118

(56) References Cited

U.S. PATENT DOCUMENTS

| | | | | |
|---|---|---|---|---|
| 3,764,996 A | 10/1973 | Ross | ........................... | 711/207 |
| 4,912,635 A | 3/1990 | Nishimukai et al. | ......... | 712/238 |
| 5,375,214 A | * 12/1994 | Mirza et al. | ................. | 711/207 |
| 5,835,963 A | 11/1998 | Yoshioka et al. | ........... | 711/207 |
| 6,058,447 A | * 5/2000 | Hilst et al. | ................... | 711/118 |

FOREIGN PATENT DOCUMENTS

| | | |
|---|---|---|
| JP | 48-74126 | 10/1973 |
| JP | 51-89356 | 8/1976 |
| JP | 60-168238 | 8/1985 |
| JP | 1-149153 | 6/1989 |
| JP | 5-216767 | 8/1993 |
| JP | 6-274341 | 9/1994 |
| JP | 8-320829 | 12/1996 |

* cited by examiner

*Primary Examiner*—Daniel H. Pan
(74) *Attorney, Agent, or Firm*—Wenderoth, Lind & Ponack, L.L.P.

(57) ABSTRACT

The present invention has for its object to provide a data processing apparatus which improves the point that in data processing employing an associative storage device, performing the high speed processing has been impossible in the full-associative constitution since each way (entry) is subjected to the sequential processing respectively in search processing. The data processing apparatus includes a TLB comprising an information pair specifying information means (RP), a first information holding means (PTE-Hi), and a second information holding means (PTE-Lo). The high speed processing against information held in a TLB memory section is realized by performing the search processing employing information held in the above-mentioned means.

10 Claims, 8 Drawing Sheets

| tsrq | va | reg-ncs | reg-r-nw | IO-ADR | IO-DATA | operation control | mode | ncs | r-nw | tlbhit | pa |
|---|---|---|---|---|---|---|---|---|---|---|---|
| 1 | VPN | 1 | - | - | - | logical/physical translation (match) | 1 | 0 | 1 | 1 | PPN |
| 1 | VPN | 1 | - | - | - | logical/physical translation (mismatch) | 1 | 0 | 1 | 0 | X |
| 0 | - | 0 | 0 | RP | data | write into RP | 0 | 1 | 0 | 0 | VPN |
| 0 | - | 0 | 0 | PTE-Hi | data | write into PTE-Hi | 0 | 1 | 0 | 0 | VPN |
| 0 | - | 0 | 0 | PTE-Lo | data | write into PTE-Lo | 1 | 0 | 0 | 0 | VPN |
| 0 | - | 0 | 0 | others | data | write into other ID spaces | 0 | 1 | 0 | 0 | VPN |
| 0 | - | 0 | 1 | RP | (RP) | read from RP | 0 | 1 | 1 | 0 | VPN |
| 0 | - | 0 | 1 | PTE-Hi | (PTE-Hi) | read from PTE-Hi | 1 | 0 | 1 | 0 | VPN |
| 0 | - | 0 | 1 | PTE-Lo | *1 | read from PTE-Lo (match) | 1 | 0 | 1 | 1 | VPN |
| 0 | - | 0 | 1 | PTE-Lo | *2 | read from PTE-Lo (mismatch) | 0 | 1 | 1 | 0 | VPN |
| 0 | - | 0 | 1 | others | (others) | read from other IO spaces | 0 | 1 | 1 | 0 | VPN |

*1 : {physical page number, page attribute, 1, 7'b0}
*2 : {X, X, 0, 7'b0}

Fig.3

Fig.4 (a) logical adderss
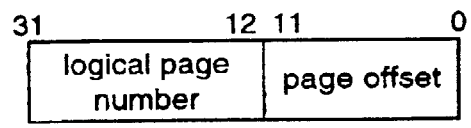
Fig.4 (b) physical address
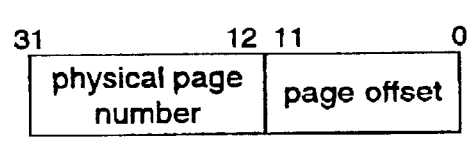
Fig.5 (a) structure of PTE-Hi
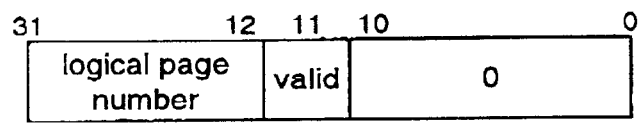
Fig.5 (b) structure of TLB tag entry
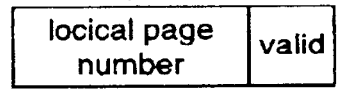
Fig.5 (c) structure of PTE-Lo
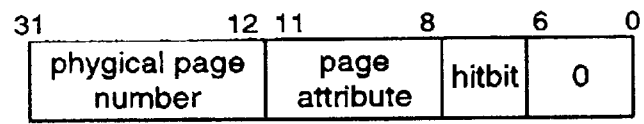
Fig.5 (d) structure of TLB data entry
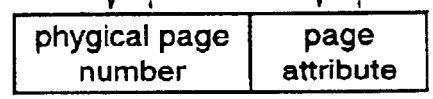

| VPN | tag | valid | match |
|-----|-----|-------|-------|
| X | X | 0 | 0 |
| X | X | 1 | 1 |
| X | Y | 0 | 0 |
| X | Y | 1 | 0 |

Fig.10

| mode | ncs | r-nw | tin | indx | din | operation | hit | tout | hit-rp | dout |
|---|---|---|---|---|---|---|---|---|---|---|
| 0 | 1 | - | - | - | - | stop | 0 | - | - | - |
| 0 | 0 | 1 | - | n | - | read from entry n | 0 | tag(n) | n | data(n) |
| 0 | 0 | 0 | tag | m | data | write into entry n | 0 | tag | m | data |
| - | - | 0 | - | - | - | stop | 0 | - | - | - |
| 1 | 1 | 1 | - | - | - | stop | 0 | - | - | - |
| 1 | 0 | 1 | vpn0 | - | - | logical/physical translation (match) | 1 | tin | h | ppn+alt |
| 1 | 0 | 1 | vpn1 | - | - | logical/physical translation (mismatch) | 0 | tin | - | - |

DATA PROCESSING DEVICE AND METHOD

TECHNICAL FIELD

The present invention relates to a data processing apparatus and a data processing method, and more particularly, to data processing by a semiconductor intergrated circuit, above all, to data processing employing associative memory.

BACKGROUND ART

In recent years, along with provision of multi-function and higher function of household electrical goods or the like, adaptation of computer technology to household products is rapidly advanced, whereby a virtual storage control unit which was conventionally employed for mainly high-grade workstations, personal computers, or the like is being adopted to operation systems (OS), which cope with the processing of a plurality of task processing also in household equipment such as a Set-Top Box, as an apparatus for connecting CATV or Internet to a television receiver.

The virtual storage control unit is technology employed for effectively utilizing a high speed semiconductor memory that is used as a main memory in a computer, and the virtual storage control unit employs an external storage device such as a hard disk that has generally low speed but has a large capacity as a substitute for a memory. By the use of the virtual storage control unit, even when a capacity of actually installed main memory is small, it is possible to drive software which requires a large capacity memory for its execution, or to deal with a large quantity of data speedily.

In order to realize this, when it comes to a state where there is no empty region in the main memory, a part of the content stored in the main memory is written into the external storage device, and it is read out therefrom when it is needed. In the virtual storage control unit, a logical address space which is larger than physical memory capacity is to be realized. The logical address space is called as a logical space while the physical memory space is called as a physical space. Since the position of the logical space is specified by a logical address and the position on the physical space is specified by a physical address, it is required in a data processing apparatus to provide a mechanism for performing translation between the logical address and the physical address so as to perform virtual storage management.

Generally, while in a computer system a plurality of tasks (a task is a unit of a work which a computer performs) are performed it reduces the processing speed to perform writing/reading of all the content concerning a task stored in a main memory every time the task is changed. Accordingly, a logical task space is divided into pages in unit, and mapping, i.e., making correspondence between a logical space and a physical space is carried out in unit of page, thereby enhancing the efficiency.

In the address translation processing, a search is performed with providing a translation table (page table) showing the correspondence relation in the external memory (main memory device or the like) and the OS referring to the translation table when it is needed. However, because a processing load for such processing is large, there are many cases where the processing speed of the data processing apparatus is decreased due to employing the virtual storage control unit. Accordingly, an address translation buffer (Translation Look-aside Buffer; hereinafter recited "TLB") which stores pairs of logical address and physical address in frequent use in a high speed memory, i.e., which cashes the same is employed, in order to realize a high speed address translation processing. The TLB may be often constituted as an associative storage device in which when an item is input as a key item an associative item in an associative relation therewith is obtained.

Generally, a cash memory comprises a data area for keeping data itself and a tag area for holding an address indicating a data storage position, or an access history, and the like. Either of the areas is managed divided into a plurality of blocks. The block constituting the data area is called as a line, and inputting/outputting of data in the cash memory is performed in line unit.

As a method for making correspondence between the data on the main memory such as the translation table with the line of the cash memory, there are a set-associative method, a direct-mapping method, and a full-associative method. The set-associative method is a method in which the cash memory and the main memory are divided into plural sets (a set is a collection of lines), and the data on the main memory can only be stored in the prescribed line in each set. When the number of sets is n, it is called n-way-set-associative method. The direct-mapping method corresponds to 1-way-set-associative method wherein the whole cash memory is dealt as one set. On the other hand, a method in which data is stored in an arbitrary line is a full-associative method.

With respect to these methods, considering the rate of making a hit with the cash, the direct-mapping method which has a strong possibility that a replacement occurs has many error hits and the low hit rate, while the full-associative method has the high hit rate by comparison. Besides, in the set-associative method, the hit rate is between those of the both methods. Generally, for the management of the cash memory the set-associative method is employed; however, in case of TLB, the adoption of the full-associative method which has the high hit rate is preferable as an adverse effect on the lowering of the processing efficiency due to the error hits is enormous.

As described above, at the time of changing tasks, content of the cash memory including the TLB is updated. Hereinafter, a TLB managing method at the time of the updating according to a prior art disclosed in Japanese Published Patent Application No. Hei. 8-320829 will be described. At the updating, the nullification processing of a TLB entry is required. In the prior art, at the nullification processing of an entry concerning the specified page, a search is performed specifying a way of the TLB that was IO-mapped employing MOV instruction.

In the nullification processing of the specified entry according to the prior art, provided that a mapping address of each way of the TLB is 0xfn000000 (n=0–7), and logical page number is 0xbeef0, the processing can be realized with the following program.

1) MOV "0xbeef0000" R0
2) MOV "0xf0000080" R1
3) MOV "0x01000000" R2
4) MOV R0, (R1)
5) ADD R2, R1

At 1), the logical page number to search (0xbeef0) and valid flag (0=invalid) are set to R0, and at 2), a mapping address (0xf0) and a flag (0x80) for making a comparison are set to R1, then at 3), an offset of the mapping address of each way (0x01000000) is set to R2. At 4), writing of the content of R0 (0xbeef0000) to the address indicated by R1 (0xf0000080) is performed, and in case where the result of the comparison of the logical page number matches, the content of R0 (0xbeef0000) is written into the that way of the TLB, while in case of making no hit, writing is not performed. At 5), the offset is added to the mapping address, thereby to create a mapping address of the next way, and the processing returns to 4), and such processing is repeated as many times as the number of the ways of the TLB.

As described above, in the TLB management according to the prior art, the content of TLB entry is searched for each way. Accordingly, the number of steps until the nullification processing is completed depends on the number of ways, that is, in case where the number of way is 1, the above-described 5 steps, 1)–5), are required, and in case where the number of way is n, 2n+2 steps are required. In the above-mentioned Japanese Published Patent Application No. Hei. 8-320829, the case of set-associative method of 2 ways or 4 ways is disclosed. In such a case where the number of ways is not very high, there is no problem in the aspect of the processing efficiency or the like; however, as the number of ways becomes high, the number of required steps is increased, whereby the time required for the processing is also increased. As described above, in case of the TLB which employs the full-associative method, the entry numbers and the way number are equal to each other, thereby resulting in a problem that the processing time is increased in proportion to the way number.

SUMMARY OF THE INVENTION

The present invention is made to solve the above-mentioned problem and has for its object to provide a data processing apparatus and a data processing method which can perform the searching processing of an associative memory such as TLB speedily.

To achieve the above-mentioned object, a data processing apparatus according to Claim 1 of the present invention is one which, employing an associative storage device which performs associative processing by storing plural pairs of first information and second information and outputs, when the specified first information is input, a second information making a pair with the specified first information, comprises: first information holding means for holding the first information; second information holding means for holding the second information; associative information control means for performing a control to execute the associative processing by inputting the first information held in the first information holding means to the associative storage device, and to hold the second information which makes a pair with the input first information and which is output as the result of the associative processing by the second information holding means when the input first information matches one among the first information stored in the associative storage device; information pair specifying information holding means for holding information which specifies a pair among pairs of the information stored in the associative storage device; and central processing unit for controlling the data processing employing the associative storage device, and the above-mentioned associative information control means of the apparatus, in response to reading out of information held by the second information holding means, by the central processing unit, performs a control to execute the associative processing by inputting the first information held in the first information holding means to the associative storage device, and to hold the second information which makes a pair with the input first information and which is output as the result of the associative processing in the second information holding means when the input first information matches one among the first information stored in the associative storage device, as well as to hold the information which specifies a pair of the matched first information and the second information in the information pair specifying information holding means, and the above-mentioned first information holding means and the above-mentioned second information holding means of the apparatus are allocated in the address space administrated by the central processing unit, and inputting/outputting of information is performed by designating information which specifies the allocation position in the address space.

According to the invention described in Claim 5, the data processing apparatus is the one which, employing an associative storage device which performs associative processing by storing plural pairs of first information and second information and outputs, when the specified first information is input, a second information making a pair with the specified first information, comprises: first information holding means for holding the first information; second information holding means for holding the second information; associative information control means for performing a control to execute the associative processing by inputting the first information held in the first information holding means to the associative storage device, and to hold the second information which makes a pair with the input first information which is output as the result of the associative processing in the second information holding means when the input first information matches one among the first information stored in the associative storage device; information pair specifying information holding means for holding information which specifies a pair among pairs of the information stored in the associative storage device; and central processing unit for controlling the data processing employing the associative storage device, and the above-described information control means of the apparatus, it response to writing of information output by the central processing unit to the second information holding means, performs a control to write the information held in the first information holding means and the information held in the second information holding means to one of the pairs in the associative storage device indicated by the information pair specifying information holding means, and the above-described first information holding meals and the above-described second information holding means are allocated in the address space administrated by the central processing unit, and inputting/outputting of information is performed by designating information which specifies the allocation position in the address space.

According to the invention described in Claim 2, in the data processing apparatus described in Claim 1 or 5, the associative storage device is an address translation table, and the first information is a logical page address while the second information is a physical page address.

According to the invention described in Claim 3, in the data processing apparatus described in Claim 1 or 5, the associative storage device is a cash memory, and the first information is an address while the second information is an instruction or data of operand.

According to the invention described in Claim 4, in the data processing apparatus described in Claim 1 or 5, the associative storage device is a branch history buffer, and the first information is an address of branch instruction while the second information is an address of branch destination instruction.

According to the invention described in Claim 9, there is provided a data processing method which, employing an associative storage device which performs associative processing by storing plural pairs of first information and second information and outputs, when the specified first information is input, a second information making a pair with the specified first information, comprises: first information holding step of holding the first information; second information holding step of holding the second information; associative processing step of making the associative processing executed by inputting the first information held in the first information holding step to the associative storage device; holding information control step of performing a control to hold the second information which makes a pair with the input first information and which is output as the result of the associative processing in the second information holdine step when the input first information matches one among the first information stored in the associative storage device; information pair specifying information holding step of holding information which specifies a pair among pairs of the information stored in the associative storage device; and central processing step of controlling the data processing employing the associative storage device, and the above-mentioned holding information control step, in response to reading out of information held in the second information holding step, in the central processing stop, performs a control to hold the information which specifies a pair of the first information matched in the associative processing step and the second information in the information pair specifying information holding step, and the above-mentioned first information holding step and the above-mentioned second information holding step of the apparatus are allocated in the address space administrated in the central processing step, and inputting/outputting of information is performed by designating the information which specifies the allocation position in the address space.

According to the invention described in Claim 10, the data processing method is the one which, employing an associative storage device which performs associative processing by storing plural pairs of first information and second information and outputs, when the specified first information is input, a second information making a pair with the specified first information, comprises: first information holding step of holding the first information; second information holding step of holding the second information; associative processing step of making the associative processing executed by inputting the first information held in the first information holding step to the associative storage device; holding information control step of performing a control to hold the second information which makes a pair with the input first information and which is output as the result of the associative processing in the second information holding step when the input first information matches one among the first information stored in the associative storage device; information pair specifying information holding step of holding information which specifies a pair among pairs of the information stored in the associative storage device; and central processing step of controlling the data processing employing the associative storage device, and the above-described holding information control step, in response to writing against the second information holding step by the central processing step, performs a control to write the information held in the first information holding step and the information held in the second information holding step to one of the pairs in the associative storage device indicated in the information pair specifying information holding step, and the above-described first information holding step and the above-describe second information holding step are allocated in the address space administrated in the central processing step, and inputting/outputting of information is performed by designating the information which specifies the allocation position in the address space.

BRIEF DESCRIPTION OF DRAWINGS

FIG. 3 is a diagram for explaining the relation between a control signal provided in the TLB and the operation of the TLB according to the first embodiment of the present invention.

FIGS. 4a–b are diagrams illustrating a structure of 32-bit address in address space according to the first embodiment of the present invention.

FIGS. 5a–d diagrams illustrating a structure of each entry in a tag section and a data section, and of PTE-Hi and PTE-Lo according to the first embodiment of the present invention.

FIG. 10 is a diagram for explaining the relation between a control signal provided with the TLB memory section and the operation of the TLB memory section according to the first embodiment of the present invention.

DETAILED DESCRIPTION OF THE PREFERRED EMBODIMENT

A data processing apparatus according to an embodiment or the present invention can perform the searching processing speedily employing a TLB.

Figure 1:
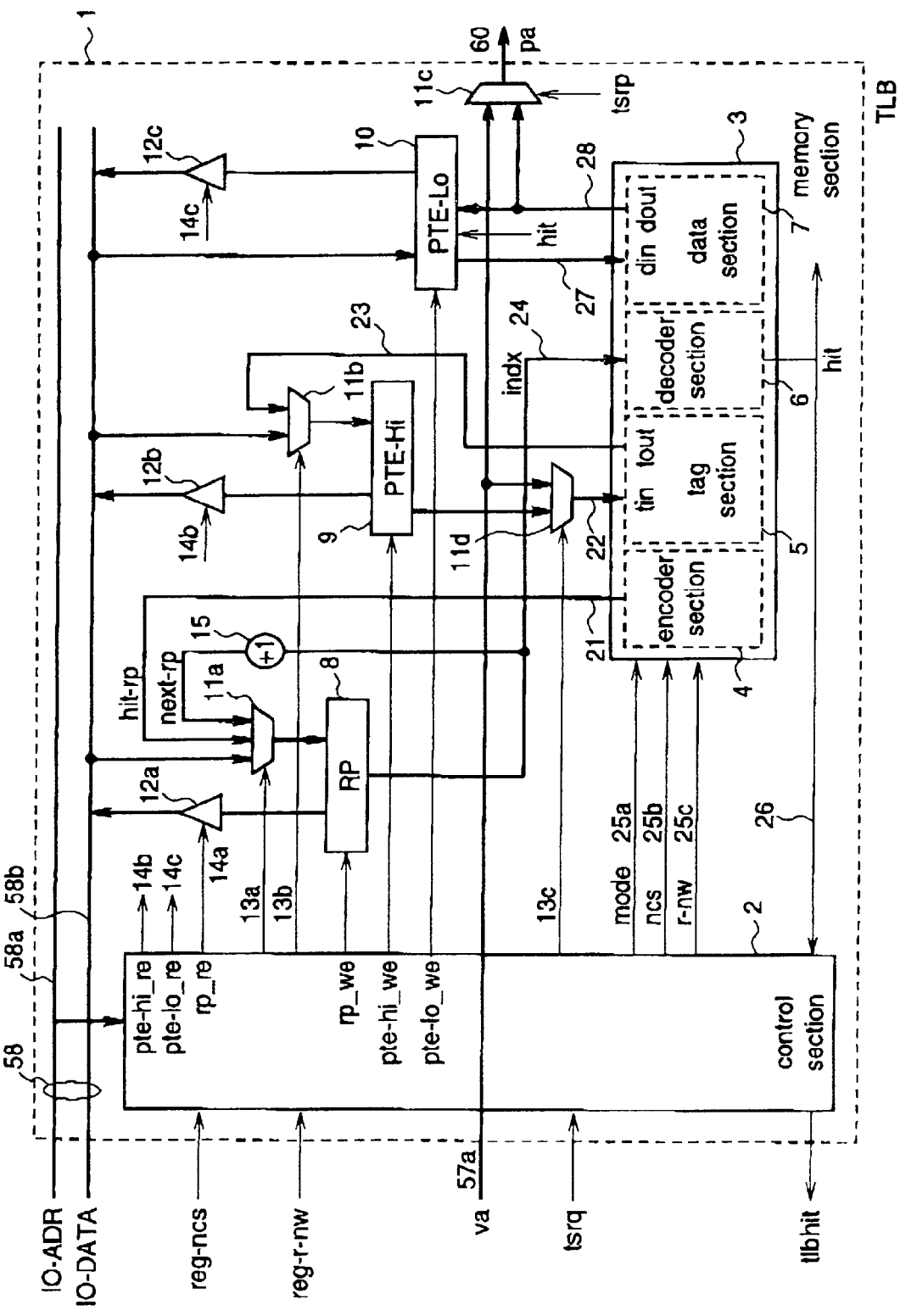
FIG. 1 is a block diagram illustrating a structure of a TLB provided in a data processing apparatus according to a first embodiment of the present invention.
Figure 2:
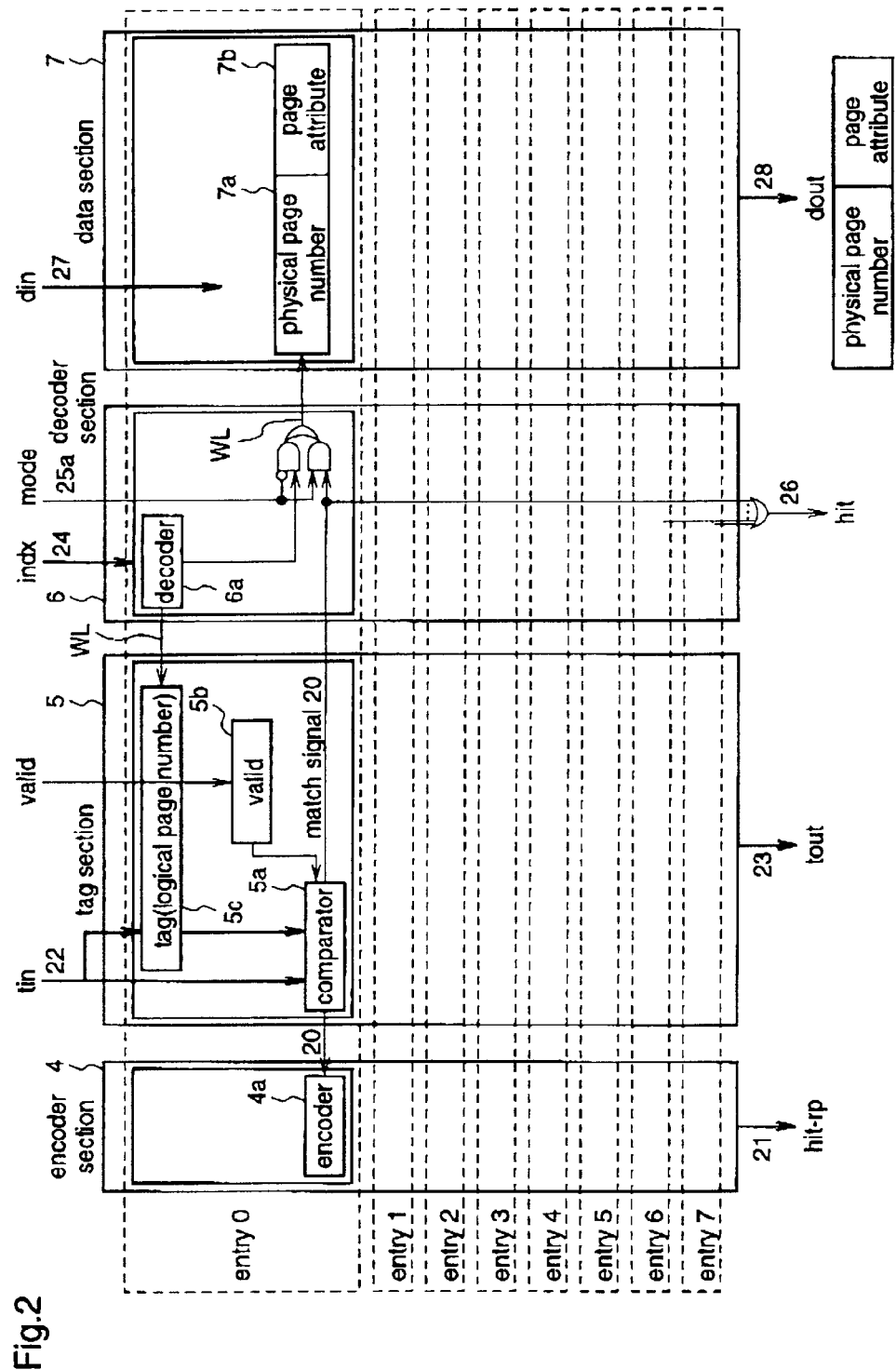
FIG. 2 is a diagram illustrating a structure of the TLB memory section provided in the TLB according to the first embodiment of the present invention.
Figure 6:
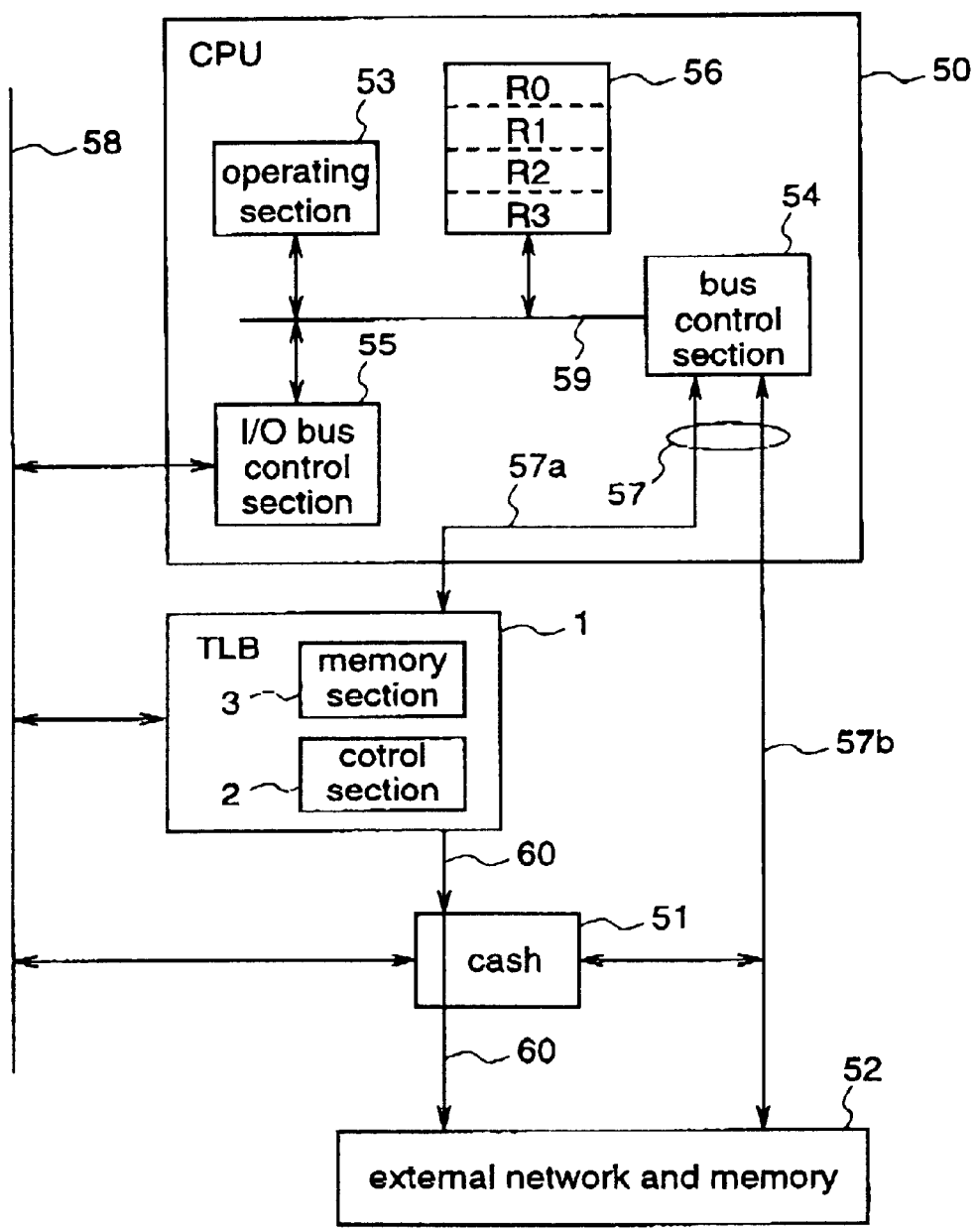
FIG. 6 is a block diagram illustrating a structure of a data processing apparatus according to the first embodiment of the present invention.

FIG. 1 is a block diagram of an address translation buffer <TLB> provided in a data processing apparatus according to this embodiment. FIG. 2 is a diagram of a TLB memory section provided in the TLB shown in FIG. 1. FIG. 6 is a block diagram showing a structure of a data processing apparatus according to this embodiment, provided with the TLB shown in FIG. 1 according to this embodiment. FIGS. 3–5 as well as FIGS. 7–10 are diagrams for explaining TLB management of the data processing apparatus.

First, the structure of the TLB according to this embodiment will be described with reference to FIG. 1. As described in the drawing, a TLB 1 according to this embodiment is provided with a TLB control section 2, a TLB memory section 3, a replace pointer register (RP) 8, a page table entry higher register (PTE-Hi) 9, a page table entry lower register (PTE-Lo) 10, selector circuits 11a–d, tristate buffers 12a–c, and an incrementor 15, and is connected to the exterior by an IO bus 58. The TLB memory section 3 comprises an encoder section 4, a tag section 5, a decoder section 6, and a data section 7. Further, the IO bus 58 comprises an address bus and a data bus, where the address bus transmits a signal ID-ADR 58*a* which indicates an address, and the data bus transmits data 58*b*.

The TLB control section 2 controls inputting and outputting, processing, and holding of a signal within the TLB 1. The TLB memory section 3 holds logical page number, physical page number, and page attribute. The RP 8 holds replacement entry number. The PTE-Hi 9 holds logical page number which has occurred a TLB error or which is to be registered newly. The PTE-Lo 10 holds physical page number which is to be registered newly and page attribute.

According to this embodiment, the PTE-Hi 9 which holds logical page number as the first information functions as a first information holding means, and the PTE-Lo 10 which holds physical page number as the second information functions as a second information holding means, and the RP 8 which holds replacement entry number for specifying a pair of logical page address and physical page address functions as an information pair specifying information holding means. Moreover, the TLB control section 2 functions as an associative information control means which controls associative processing and information holding.

The selector circuit 11*a* receives IO-DATA 58*b* which is the data acquired through the IO bus, the number of an entry which made a hit (hit-rp) 21, and the number which is the result of adding "1" to the present replacement pointer (next-rp), and selects one of them according to the instruction by the TLB control section 2. The selector circuit 11*b* receives IO-DATA 58*b* and the logical page number which has occurred a TLB error (tout) 23, and selects either of them according to the instruction by the TLB control section 2. The selector circuit 11*c* receives the logical page number included in the logical address "va" and the physical page number included in "dout" 28 which is output by the TLB memory section 3, and selects either of them according to an address translation request signal ("tsrq"). The selector circuit 11*d* receives the logical page number included in the logical address "va" 57*a* and the logical page number stored in the PTE-Hi 9, and selects either of them according to the instruction by the TLB control section 2.

The tristate buffer 12*a*–*c* are employed on the occasion of reading the RP 8, the PTE-Hi 9, and the PTE-Lo 10, hold temporarily the content held by the RP 8, the PTE-Hi 9, or the PTE-Lo 10, and output it to the data bus 58*b* according to the control by the TLB control section 2. The incrementor 15 adds 1 to an input signal, and outputs its result. The IO bus 58 is a common line for the signal transmission, and comprises the address bus employed for the transmission of an address indicating the storing position and the data bus employed for the transmission of data.

Next, the structure of the data processing apparatus according to this embodiment will be described with reference to FIG. 6. As described in the drawing, the data processing apparatus according to this embodiment is provided with the address translation buffer (TLB) 1, a central processing unit (CPU) 50, a cash 51, and an external network memory 52, and the CPU 50, the TLB 1, and the cash 51 are connected with the IO bus 58. Further, the CPU 50 is provided with a operating section 53, a bus control section 54, an IO bus control section 55, and a general register 56, which are connected with an internal bus 59. Moreover, the bus control section 54 which the CPU 50 contains is connected with the TLB 1, the cash 51, and the external network memory 52 by an external bus 57.

The TLB 1 holds a copy of the address translation table which indicates the correspondence relation between the logical address and the physical address. The CPU 50 controls the processing of the whole data processing apparatus. The operating section 53 which the CPU 50 contains performs the operation processing such as logical operation. The bus control section 54 controls the transmission in the external bus 57 and the internal bus 59. The IO bus control section 55 controls the transmission in the internal bus 59 and the IO bus 58. The general register 56 is employed for the temporal retention of data inside the CPU. The TLB 1 functions as an associative storage device, and the CPU 50 functions as a central processing unit for controlling the processing of the whole data processing apparatus.

Next, the structure of the TLB memory section 3 according to this embodiment will be described with reference to FIG. 2. As shown in the drawing, the TLB 1 according to this embodiment comprises the encoder section 4, the tag section 5, the decoder section 6, and the data section 7. Further, it has a plurality of entries specified by entry number, here, 8 entries from entry 0 to 7. Each entry holds and processes a pair of logical page number and physical page number, as well as additional information.

The encoder section 4 including an encoder 4*a*, receives a match signal 20 from the tag section 5, performs encoding processing against the entry number of the particular entry at the encoder 4*a* when the match signal shows a match, and outputs the encoded entry number. When there is an output from one of the entries, a hit-rp signal 21 which indicates the specified entry number is output from the TLB memory section 3. The tag section 5 includes a comparator 5*a*, a valid bit holding section 5, and a tag memory 5*c*. The comparator 5*a* performs a comparison between the content of the tag memory 5*c* and the logical page number input by a tin 22, and generates the match signal 20 which indicates the result of the comparison and outputs the same. The valid bit holding section 5*b* holds a valid bit which indicates validity/invalidity of the entry. The tag memory 5*c* stores the logical page number.

The decoder section 6, which contains a decoder 6*a* for decoding an indx signal 24 which is input externally, drives a word line WL according to the match signal 20 output from the TLB tag section 5, and activates the corresponding entries of the tag section 5 and the data section 7. The data section 7 stores a logical page number 7*a* and a page attribute 7*b*.

Here, according to this embodiment, it is supposed that the logical space and the physical space are the address spaces of 32 bits, the structure of the TLB is full-associative (8-entry-full associative as described above), the page size is 4 KB, and the replacement algorithm is FIFO (First In First Out).

FIG. 4 is a diagram illustrating a structure of 32-bit address of the address space according to this embodiment. As shown in FIG. 4(*a*), the address space is divided into pages of 4 KB, and comprises the logical page number as the page number of 20 bits (VPN), and the within page offset of 12 bits. Besides, as shown in FIG. 4(*b*), the physical address comprises the physical page number of 20 bits (PPN) and the within page offset of 12 bits in the same way. Further, the within page offsets in the corresponding logical address and the physical address have the identical value.

FIG. 5 is a diagram illustrating a structure of each entry of the tag section 5 and the data section 7 as well as a structure of the PTE-Hi 9 and the PTE-Lo 10. As shown in FIG. 5(*b*), each entry (0–7) of the tag section 5 comprises the logical page number and the valid bit indicating validity/invalidity of the entry. Moreover, as shown in FIG. 5(*d*), each entry of the data section 7 comprises the logical page number and the page attribute. Though page protection information of 2 bits, fouling bit, page valid bit, or the like are included in the page attribute, the description will be omitted as they have no direct relation to the present invention.

Further, the structure of the PTE-Hi 9 as shown in FIG. 5(*a*) corresponds to the structure of the entry of the tag section 5 as shown in FIG. 5(*b*). Likewise, the structure of the PTE-Lo 10 as shown in FIG. 5(*c*) corresponds to the structure of the entry of the data section 7 as shown in FIG. 5(*d*). Besides, as shown in FIG. 5(*c*), in the lower bit included in the PTE-Lo 10, hitbit of 1 bit which indicates the TLB search result is stored.

Figures 7, 8:
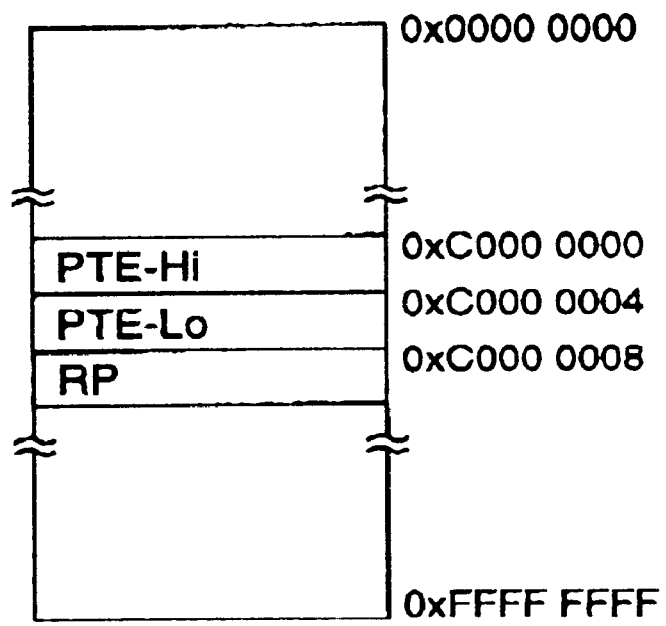
FIG. 7 is a diagram illustrating the address space managed by CPU according to the first embodiment of the present invention.
FIG. 8 is a diagram for explaining the operation of the tag section provided in the TLB according to the first embodiment of the present invention.

FIG. 7 is a diagram illustrating the address space the CPU 50 (FIG. 6) manages. The address space is 4 GB, in which the RP 8 is located at the address 0xC0000008, and the PTE-Hi 9, at the address 0xC0000000, and the PTE-Lo 10, at the address 0xC0000004. In addition, instructions or data which are required to operate the CPU 50 are also allocated in this address space; however, as they have no direct relation to the present invention, the description will be omitted.

Figure 9:
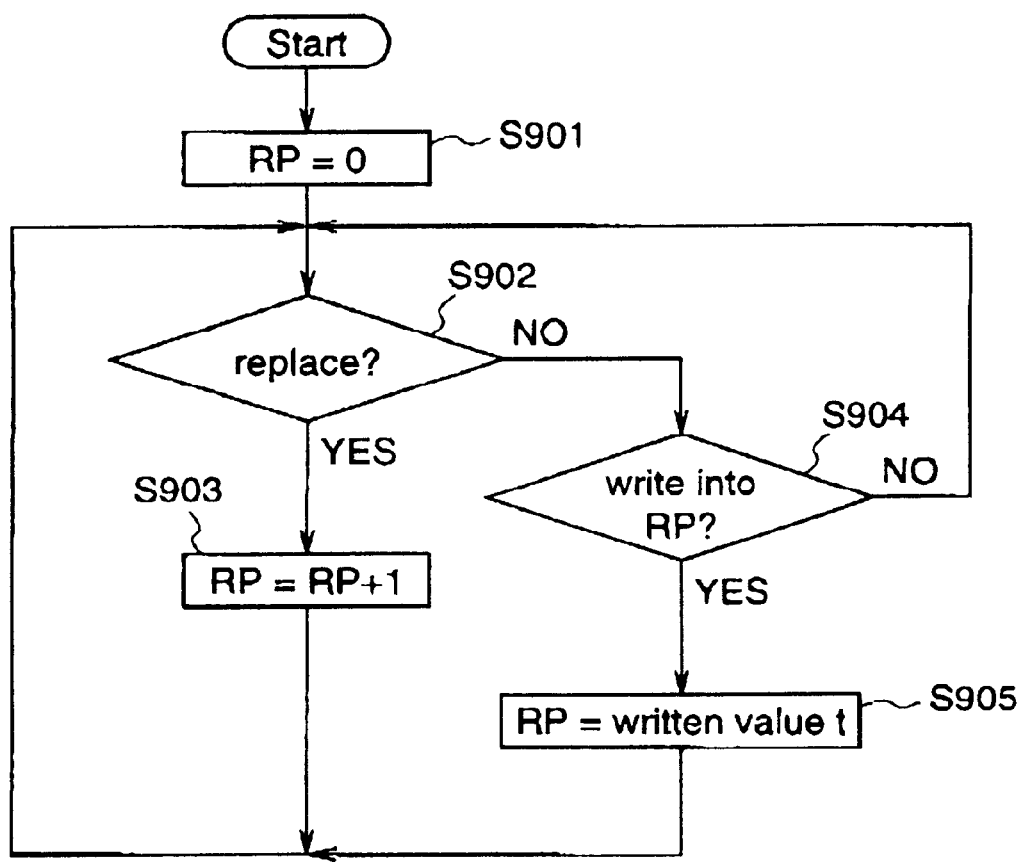
FIG. 9 is a flowchart for explaining the procedure of the replacement processing of the TLB according to the first embodiment of the present invention.

FIG. 3 is a diagram for explaining the relation between the control signal provided to the TLB 1 and the operation of the TLB 1. FIG. 8 is a diagram for explaining the operation of the tag section 7. FIG. 9 is a flowchart for explaining the procedure of the replacement operation of the TLB 1. FIG. 10 is a diagram for explaining the relation between the control signal provided to the TLB memory section 3 and the operation of the memory.

The operation on the occasion of the TLB management of the data processing apparatus so constituted according to this embodiment will be described with respect to "A. address translating operation", "B. read/write to a register", "C. registration to TLB", "D. search for TLB", "E. TLB replacement operation", and "F. nullification processing" with reference to FIGS. 1 through 10.

A. address translating operation

Hereinafter, the address translating operation by the TLB 1 of the data processing apparatus according to this embodiment will be described.

FIG. 3 is a diagram for explaining the relation between the control signal provided to the TLB 1 and the operation of the TLB 1. In the drawing, the signal tsrq is a logical/physical address translation request signal, it indicates that the translation is to be performed when its value is "1", while it indicates that the translation is not to be performed when its value is "0". The signal va shown in FIG. 3 indicates the logical address, and the signal reg-ncs in the drawing is a selection signal for transmitting requests to the above-mentioned 3 registers (8–10 in FIG. 1). Moreover, the signal reg-r-nw is a signal for indicating the access condition toward the register 8–10, it indicates that there is a reading request when its value is "1", while it indicates that there is a writing request when its value is "0". The signals tsrq, reg-ncs, and reg-r-nw are signals which are output to TLB 1 via the external bus 57*a* from the CPU 50 in FIG. 6, and are input to the TLB control section 2 within the TLB 1 as shown in FIG. 1. The signal IO-ADR in FIG. 3 is a signal for indicating address, and IO-DATA is a data to be transmitted, both of which are output to the IO bus 58 by the CPU 50, are transmitted to TLB 1, and become the signal 58*a* and 58*b* shown in FIG. 1.

The signal mode shown in FIG. 3 is a signal which indicates the operation mode of the TLB memory section 3, and in case where the value is "1", the TLB search and translation are performed, while in case where the value is "0", the search and the translation are not performed. The signal ncs in the drawing is a selection signal for transmitting the instruction to the TLB memory section 3, and it indicates selection when its value is "0", while it indicates non-selection when its value is "1". The signal r-nw in the drawing is a signal which indicates the access condition toward the TLB memory section 3, and it indicates that there is a reading request when its value is "1", while it indicates that there is a writing request when its value is "0". The signals "mode", "ncs", and "r-nw" are signals which are all generated at the TLB control section 2 and output to the TLB memory section 3.

The signal tlbhit shown in FIG. 3 is a TLB hit signal, and it indicates that there exists that entry as the result of searching the TLB memory section 3 when its value is "1". Further, the signal pa in the drawing indicates the physical address. The signal tlbhit is a signal which is generated at the TLB control section 2, the address pa is the result of the selection at the selector 11*c*, and both of the signals output from the TLB 1.

FIG. 8 is a diagram for explaining the operation of the tag section 5. The signal VPN indicates the logical page number which is input externally, and the signal "valid" in the drawing is a signal which indicates that entry is valid. The logical page number VPN and the signal "valid" are signals which are input to the tag section 5 as described in FIG. 2. The tag in FIG. 8 is the content which the tag memory 5*c* holds (logical page number) in FIG. 2. The "match" signal in the drawing is a signal that the comparator 5*a* outputs as indicating the result of comparison which is performed by itself in FIG. 2.

FIG. 10 is a diagram illustrating the control signal provided to the TLM memory section 3 in FIG. 1 and the operation of the TLB memory section 3. The signals "mode", "ncs", and "r-nw" in the drawing are the same as those shown in FIG. 3, respectively. The signal "tin" as shown in FIG. 10 indicates the logical page number input to the TLB tag section 5, and the signal "indx" in the drawing is an index for specifying the entry of the TLB memory section 3, and the signal "din" in the drawing is data input to the data section 7 and is constituted by the logical page number and the page attribute. As described in FIG. 1, the signals "tin" 22, "indx" 24, and "din" 17 are signals input to the TLB memory section 3 from the selector 11*d*, from the register RP 8, and from the register PTE-Lo 10, respectively.

The signal "hit" as described in FIG. 10, which is the TLB hit signal, corresponds to the "tlbhit" shown in FIG. 3. The signals "tout" and "dout" in FIG. 10 are output data from the tag section 5 and the data section 7, respectively, and their formats correspond to the signals "tin" and "din", respectively. The "hit-rp" as described in FIG. 10 is a pointer for indicating the entry which was hit on the occasion of research at the TLB memory section 3, and the value agrees with that of the signal "indx" at the time of non-search (mode=0). As described in FIG. 1, the signals "hit" 26, "tout" 23, "dout" 28, and "hit-rp" 21 are signals output from the TLB memory section 3 to the TLB control section 2, to the selector 11*b*, to the register PTE-Lo 10 and the selector 11*c*, and to the selector 11*a*, respectively.

In the data processing apparatus according to this embodiment described in FIG. 6, the CPU 50 transmits the particular address to the TLB 1 through the external bus 57*a* on the occasion of instruction fetch or read/write of data. The signal indicating logical page number VPN, which becomes the signal "va" shown in FIG. 1, is input to the TLB 1. Based on this, the CPU 50 transmits the logical/physical translation request to the TLB 1 as required. Hereinafter, the operation of the TLB 1 will be described with respect to a case where the logical/physical translation is performed (A-1), and a case where the translation is not performed (A-2), in response to the request from the CPU 50.

A-1. A Case Where the Logical/physical Translation is Performed

The CPU 50 inputs the tsrq signal and the reg-ncs signal shown in FIG. 1 to the TLB 1 as tsrq=1, reg-ncs=1 (FIG. 3). These signals are input to the control section 2 of the TLB 1, and the TLB control section 2 issues the instruction to the TLB memory section 3 to perform the logical/physical translation following the table shown in FIG. 10. This instruction is performed by outputting the mode signal 25a, the ncs signal 25b, and the r-ns signal 25c shown in FIG. 1 as mode=1, ncs=0, r-nw=1 (FIG. 10). Further, to the selector 11d, it is instructed to select the signal "va" by the signal 13c.

According to this, the tag section 5 contained in the TLB memory section 3 performs a comparison between the logical page number (VPN) which is input as the signal "va" from the input tin 22 and the tag stored in each entry of the TLB tag section 5. This comparison is performed following the table in FIG. 8. The subsequent operation will be described with respect to a case where it becomes a TLB hit (A-1-1), and a case where it becomes a TLB error (A-1-2).

A-1-1 . (TLB Hit)

As described in FIG. 2, at each entry of the tag section 5, the comparator 5a performs a comparison between the logical page number VPN and the content of the tag memory 5c. Then, in case where the comparator judges that there is a match, that is, that VPN=tag (the content of the tag memory 5c), and the content which the valid bit holding section 5b holds indicates that the entry is valid (valid=1), match=1 is realized as shown in FIG. 8, thereby the comparator 5a outputs the match signal 20 with its value "1". When the match signal 20 indicating "1" is output at any of the entries, the hit signal 26 is activated as shown in FIG. 2. That is, the "hit" signal having the value "1" is output. In addition, the WL is activated as described in FIG. 2, and the logical page number 7a and the page attribute 7b stored in the entry at which a match is realized are output from the output "dout" 28. At the same time, the encoder section 4 encodes the number of the entry which was hit, and outputs the encoded entry number as the output "hit-rp" 21.

As shown in FIG. 1, the selector 11c receives the "tsrq" signal which indicates the translation request, and in response thereto, the selector 11c outputs the physical page number included in the output "dout" 28 from the TLB memory section 3 and the page offset included in the input signal "va" 57a, as physical addresses, to the outside of the TLB 1 as the output "pa" 60. In FIG. 6, the output 60 from the TLB 1 is transmitted to the cash memory 51.

A-1-2. (TLB Error)

On the other hand, in case where no match is realized at all the entries (VPN!=tag), or where a match is realized at one of the entries but that entry is invalid (VPN=tag, valid=0), match=0 is realized as shown in FIG. 8, and the match signal indicating "0" is output at all entries. Accordingly, as shown in FIG. 2, the hit signal 26 is inactivated (=0) and the WL is also inactivated, and therefore the output of the "dout" 28 is made invalid, resulting in outputting the content of the "tin" 22 from the "tout" 23. In FIG. 1, upon reception of that the hit signal 26 was inactivated, the TLB control section 2 instructs the selector 11b to select the "tout" 23, as well as activates the PTE-Hi 9 write enable (pte-hi_we). Thereby, the content of the "tout" 23 is stored in the PTE-Hi 9.

A-2. A Case where the Logical/physical Translation Is Not Performed

The CPU 50 inputs the "tsrq" signal and the "reg-ncs" signal shown in FIG. 1 to the TLB 1 as tsrq=0, reg-ncs=* (either 0 or 1 is possible) (FIG. 3). These signals are input to the control section 2 in the TLB 1, and the TLB control section 2 issues the stop instruction against the TLB memory section 3. This instruction is executed by using the mode signal 25a, the "ncs" signal 25b, and the "r-nw" signal 25c shown in FIG. 1 as mode=0, ncs=1, r-nw=* (either 0 or 1 is possible) (FIG. 10). Meanwhile, according to that the "tsrq" signal indicates "0", the selector 11 outputs the logical address "va" 57a as the physical address as it is from the pa 60, and it is transmitted to the cash memory 51.

B. Read/write to the Register

Next, the read/write operation against each register in the TLB 1 of this embodiment will be described. The built-in register in TLB in this embodiment is allocated in the memory space administrated by the CPU at PTE-Hi :0xC0000000

PTE-Lo :0xC0000004

RP :0xC0000008

Respectively, as shown in FIG. 7.

Writing into each register is realized by employing the MOV instruction the above-described address from the general register 56 inside the CPU 50 shown in FIG. 6. For example, by an instruction "MOV R0, (0xC0000008)", the data stored in the R0 of the CPU general register 56 is transferred to the internal bus 59. The bus control section 54 and the IO bus control section 55 identify the transfer destination address, and when the correspondence is reached, the data and address on the internal bus 59 is transferred to respective buses.

Since this case is a writing access to the IO bus 58, the IO bus control section 55 outputs the writing request to the device on the IO bus 58. This request is executed by outputting the reg-ncs signal and the reg-r-nw signal shown in FIG. 1 as reg-ncs=0, reg-r-nw=0 (FIG. 3). With the outputting of these signals, the CPU 50 transfers the data and address to the IO bus 58. The TLB control section 2 receives the writing request by the above-mentioned respective signals, decodes the IO-ADR 58a obtained from the address bus 58a, and the particular register is determined. Since the above-described address matches that of the RP 8, and the signals indicating writing request are input, the TLB control section 2 activates the signal "rp-we" (FIG. 1) which is to be output to the RP 8, and outputs the instruction 13a to the selector 11a to select the IO-DATA 58b. Responding to the instruction, the selector 11a acquires the IO-DATA 58b from the data bus 58b, and outputs the data to the RP 8, thereby the IO-DATA 58b is written into the RP 8.

Likewise, reading from the register RP 8 is performed by "Mov (0xC0000008), R0". In FIG. 6, the IO bus control section 55 outputs the reading request to the device on the IO bus 58. This request is executed by outputting the reg-ncs signal and the reg-r-nw signal in FIG. 1 as reg-ncs=0, reg-r-nw=1 (FIG. 3), and these signals are input to the TLB control section 2. The TLB control section 2, upon receipt of the reading request by these signals, decodes the IO-ADR 58a obtained from the address bus 58a, thereby to judge the particular register. Since the above-mentioned address matches that of the RP 8, and the signals indicating reading request are input, the TLB control section 2 activates the signal "rp_re" which is to be output to the RP 8, as well as issues the instruction to the tristate buffer 12a to output the data. This instruction is executed by the "rp_re" signal 14a shown in FIG. 1. The data output from the tristate buffer 12a in the figure is stored in R0 of the CPU built-in general register 56, via the data bus IO-DATA 58b, and subsequently the internal bus 59 shown in FIG. 6, in a reverse way to the case of writing.

Further, on the occasion of read/write to the PTE-Hi 9, the processing of read/write to the RP 8 as described above is similarly performed.

On the contrary, in this embodiment, the PTE-Lo 10 is not the one against which this kind of read/write is performed but the one which performs the processing described later against the content stored in the TLB memory section 3 on the occasion of registration, search, and replacement so as to realize the retention of data inside itself. That is, while the RP 8 and the PTE-Hi 9 shown in FIG. 1 are what the TLB contains as registers physically existing, the PTE-Lo 10 is not contained as a physical register but regarded as the one which exists only logically by performing the later-mentioned processing. Thereby, in this embodiment, the circuit construction can be simplified, and the efficiency of the processing is improved. However, it is also possible to construct the apparatus such that the PTE-Lo 10 is one which the TLB 1 contains as a register physically existing, and against which read/write is performed in the same way as against the RP 8 and the PTE-Hi 9 mentioned above.

C. Registration to the TLB

Next, the registration operation to the TLB 1 in the data processing apparatus according to this embodiment will be described. The registration to the TLB 1 is realized by executing the following program sequence.

1) MOV 0x00000001, R0
2) MOV R0, (0xC0000008)
3) MOV 0x10000000, R1
4) MOV R1, (0xC0000000)
5) MOV 0x20000000, R2
6) MOV R2, (0xC0000004)

At 1), the immediate value "0x00000001", is stored in R0 of the general register 56 built in in the CPU 50 shown in FIG. 6. At 2), the value stored in R0 is stored (written) into the register RP 8 of the TLB 1. This operation is performed as described in "B. Read/write to the register". At this time, because the content the RP 8 holds is "0x00000001", the replacement entry of the TLB memory section 3 is "1", which is output to the "indx" 24 shown in FIG. 1.

Subsequently, at 3), the immediate value "0x10000000" is stored in R1 of the general register 56 shown in FIG. 6. Then, at 4), the value stored in the register R1 is stored (written) into the PTE-Hi 9. This operation is also performed as described in "B. Read/write to the register".

As mentioned above, the storing (writing) processing to the PTE-Lo 10 is different from those to the RP 8 and the PTE-Hi 9 respectively. At 5) of the above-described program, the immediate value "0x20000000" is stored in R2 of the general register 56 shown in FIG. 6. Then, at 6), the operation of storing the value stored in the register R2 into the PTE-Lo 10 is started. In case of writing into to the PTE-Lo 10, the transfer destination address (0xC0000004) and the data (0x20000000) are output to the IO-ADR 58a and the IO-DATA 58b, at the IO bus 58 shown in FIG. 1, respectively.

In FIG. 1, upon detecting writing into the PTE-Lo 10, the TLB control section 2 outputs the instruction of writing for writing into the TLB memory section 3. This instruction is executed by making the mode signal 25a, the "ncs" signal 25b, and the "r-ns" signal 25c in the figure as mode=0, ncs=0, r-nw=0(FIG. 3), respectively. Further, accompanying therewith the TLB control section 2 issues the instruction to the selector 11d by the signal 13c to select the predetermined output of PTE-Hi 9 (0x10000000), and to output it to the "tin"22. As the "din" 27, the output from the PTE-Lo 10, the IO-DATA 58b (0x20000000) obtained from the IO bus 58 is output as it is.

The decoder 6a of each entry of the decoder section 6 in the TLB memory section 3 shown in FIG. 2 decodes the input "indx" 24, and activates the WL of the particular entry. According to the activated WL, the tag section 5 and the data section 7 of that entry, following the writing instruction, store respectively the content of the "tin" 22 and the "din" 27 which are input. According to the operation mentioned above, the logical page number stored in the PTE-Hi 9, the physical page number and the page attribute set in the register R2 of the CPU 50 are registered in the particular entry of the TLB memory section 3 indicated by the RP 8.

D. Search of the TLB

A search of the TLB 1 in the data processing apparatus according to this embodiment is realized by executing the following program sequence.

1) MOV 0x10000000, R1
2) MOV R1, (0xC0000000)
3) MOV (0xC0000004), R2

At 1), the immediate value "0x10000000" is stored in R1 of the general register 56 built in in the CPU 50 shown in figure 6. Then, at 2), the value stored in the register R1 is stored (written) into the PTE-Hi 9 of the TLB 1. The writing on this occasion is performed following the operation described in "B. Read/write to the register".

Subsequently, at 3), the operation of storing the value stored in the PTE-Lo 10 of the TLB 1 into R2 of the general register 56 is started. In FIG. 2, upon detecting the reading request from the PTE-Lo 10, the TLB control section 2 outputs the instruction of the logical/physical translation to the TLB memory section 3. This instruction is executed by using the "mode" signal 25a, the "ncs" signal 25b, and the "r-nw" signal 25c shown in FIG. 1 as mode=1, ncs=0, r-nw=1 (FIG. 3), respectively. In addition, the TLB control section 2 issues the instruction to the selector 11d by the signal 13c to select the output of the register PTE-Hi 9 and output it to the "tin" 22. Further, the TLB control section 2 outputs the instruction to the tristate buffer 12c by the signal 14c to output the data.

In the TLB memory section 3, a comparison is made in the tag section 5 in response to the "tsrq" signal which instructs to perform the address translation. The address translation operation is performed as described in "A. Address translation operation". As the result, the signal "hit" 26 and the signal "dout" 28 output from the TLB memory section 3 are output from the IO bus 58 as the IO-DATA 58b via the register PTE-Lo 10 and the tristate buffer 12c. The output data and signal "hit" are allocated in the format of the PTE-Lo 10 shown in FIG. 5(c), and stored in the register R2 of the CPU 50 via the IO bus 58 and the built-in bus 59 shown in FIG. 6. In case of hit, the hitbit shown in FIG. 5(c) is stored with its value "1", and the physical page number and the page attribute are valid. On the contrary, in case error hit, the value of the hitbit shown in FIG. 5(c) is "0", and the physical page number and the page attribute are invalid.

According to the operation described above, in the encoder section 4 shown in FIG. 2, the entry number which was hit is encoded, and the encoded entry number is output as the output "hit-rp" 21. The output signal "hit-rp" 21 is input to the selector 11a shown in FIG. 1. The TLB control section 2 issues the instruction to the selector 11a to select the signal "hit-rp" 21 by the control signal 13a. Accordingly, the output of the selector 11a is stored in the RP 8 only when the signal "hit"26 indicating hit is valid (when the value is "1").

According to the operation mentioned above, search and comparison between the logical page number stored in the PTE-Hi 9 and the tag stored in all the entries of the tag section 5 are made in parallel, and the search results are stored in the register R2 of the CPU 50.

E. TLB Replacement Operation

Next, the operation on the occasion of replacement of the TLB 1 in the data processing apparatus according to this embodiment will be described with reference to a flowchart showing the procedure described in FIG. 9.

As mentioned above, replacement of the TLB 1 according to this embodiment is performed following the FIFO algorithm. In addition, replacement is controlled following the value held in the RP 8.

When the procedure of the flowchart in FIG. 9 starts, in step 901, entry 0 is set as an entry of a replacement candidate in an initial state. That is, the value the PR 8 holds is "0". The replacement in the entry 0 is realized as the registration operation to the TLB 1 as described in "C. Registration to TLB".

In step 902, whether or not the replacement has been performed is judged. In this judgement, when it is regarded the replacement has been performed, step 903 is executed. In FIG. 1, the TLB control section 2 instructs the selector 11a to select the output of the incrementor 15 (=1). Then the RP pointer write enable signal (rp_we) is activated, and the output of the incrementor 15 is stored in the RP 8, thereby the content held in the register RP 8 is increased by 1.

After step 903 is executed, the processing returns to step 902, where the judgement is executed again. After the replacement to the entry 7 is completed in the same repetition, the output of the incremanta 15 is 0, and the initial value 0 is set again as a next candidate.

On the other hand, in the judgement in step 902, when it is regarded the replacement has not been performed, step 904 is executed, where whether or not writing into the RP 8 has been performed is judged. When judged writing into the RP 8 has been performed, step 905 is executed, where the written value is regarded as a next replacement candidate. On the contrary, in the judgements in step 902 and subsequent step 904, when it is judged neither the replacement operation nor writing into the RP 8 has been performed, the processing returns to step 902 without going through step 903 or step 905, whereby the present value of the RP 8 is kept held until the next replacement operation or writing into the RP 8.

In this way, the data processing apparatus according to this embodiment is provided with the TLB 1 which comprises the replace pointer register (RP) 8, the page table entry higher register (PTE-Hi) 9, and the page table entry lower register (PTE-Lo) 10. Thereby, by the MOV operation (operation following the MOV instruction) from the PTE-Lo 10 allocated in the address space administrated by the CPU 50 to the CPU built-in general register 56, a comparison between the logical page number stored in the PTE-Hi 9 and all the tags stored in the TLB tag section 5 is made, and the matched entry number is stored in the RP 8, as well as the data stored in the TLB data section 7 is stored into the CPU built-in general register 56. Moreover, by the MOV operation from the CPU built-in general register 56 to the PTE-Lo 10, the content of the PTE-Hi 9 and that of the CPU built-in general register 56 are stored respectively in the entry of the TLB tag section 5 and the TLB data section 7 indicated by the content the RP 8 holds.

F. Nullification processing

When nullifying the information on the specified logical page number from the TLB, the following program sequence is executed in this embodiment.

1) MOV 0x10000000, R1
2) MOV R1, (0xC0000000)
3) MOV (0xC0000004), R2
4) AND 0x00000080, R2
5) CMP 0x000080, R2
6) Bne Not_exist
7) MOV 0x00000000, R0
8) MOV R0, (0xC0000000)
9) MOV R0, (0xC0000004)

1) to 3) in the above-mentioned program are equal to the 3 steps of the processing described in "D. Search of the TLB", and they are executed as mentioned above.

Subsequent 4) is the processing for taking the hit bit, and bits other than the hit bit are set as 0 by performing AND processing. According to the result of this processing, in 5), checking about the hit bit is performed by the comparison processing. Then, based on this result, in 6), the comparison result conditional branch is performed. When the result indicating a mismatch is obtained in the comparison processing, jumping to the predetermined Not_exist is performed, and the subsequent processing is continued without performing the nullification processing. Here, the hit bit is extracted by performing the AND processing; however, it is also possible to employ OR processing.

When the result indicating a match is obtained in the comparison processing, registration to the TLB is performed. Though it is possible to perform registration by carrying out the processing of 6 steps shown in "C. Registration to the TLB", in this embodiment, the above-described 7)–8) is executed as a substitute for the processing shown in "C. Registration to the TLB" so that the number of steps can be reduced, thereby realizing the speedy processing.

The processing shown in "C. Registration to the TLB"requires 2 steps for writing into the RP 8; however, since the entry number which was hit in the preceding search has already been stored in the RP 8, two steps of 1) and 2) of the program in "C. Registration to the TLB" are omitted here. Accordingly, registration to the TLB is performed from the storing processing to the PTE-Hi 9 here. Steps of writing into the PTE-Hi 9 correspond to 7) and 8) in the above-mentioned program, and these two steps are executed in the same way as those of 3) and 4) of the program in the "C. Registration to the TLB". However, the register R0 is employed instead of the register R1 here. In 7), the immediate value "0x00000000" to clear the entry is stored in R0 of the general register 56 shown in FIG. 6, and in subsequent 8), the value stored in the register R0 is stored (written) into the PTE-Hi 9. This operation is performed as described in "B. Read/write to the register".

Next, the processing to the PTE-Lo 10 is performed. Since all the bits are to be set as 0 in order to clear the entry as in the processing to the PTE-Hi 9, the value which has already been stored in R0 of the register 56 (FIG. 6) in above-mentioned 7) is written into the PTE-Lo 10 here in 9) The processing in 9) is performed in the same way as that in 6) of the program in "C. Registration to the TLB", and the nullification processing finishes by writing 0 entirely in the TLB memory section 3 (FIG. 1). In this way, the processing is performed by executing a step of 9) in the above-described program instead of two steps of 5) and 6) shown in the "C. Registration to the TLB", thereby reducing one step.

Accordingly, when registration to the TLB is performed according to the processing of 6 steps described in "C. Registration to the TLB" as mentioned above, the 6 steps required for registration are added to the 6 steps of 1)–6) in the above-described program sequence, i.e., 12 steps are required in total. However, when performing registration according to the processing of the above-mentioned program sequence, 3 steps are reduced in the registration processing, i.e., the nullification processing can be performed by 9 steps in total.

As described in prior art, when performing the nullification processing in a prior art data processing apparatus, for example, by employing, the 8-entry-full-associative method, the numbers of the entry and the way are equal, and 2n+2 steps are required in case of the number of the way being n, and therefore, in case of n=8, 2n+2=18 steps are required. Therefore, in this embodiment where the number of the step is 9, 50% of the step number can be reduced as compared with the case of the prior art.

Further, most of the TLBs which are currently mainly employed have a constitution of full-associative method having more than 32 entries, and in such a case where the number of the way (entry) is large, considerable effects can be obtained by applying the data processing apparatus according to this embodiment. That is, in the prior art data processing apparatus, the number of repetition is increased according to the number of the way (entry), i.e., in case of 32 entries, 66 steps are required. On the other hand, in case of applying the data processing apparatus according to the embodiment of the present invention, only 9 steps as mentioned above are required regardless of the number of the way, whereby more than 83% of the step number can be reduced.

Moreover, the constitution of the address space or the program sequences described in this embodiment are examples, and the similar efficient processing is possible by employing other space allocations or instruction.

In addition, in this embodiment, the TLB is described as the one having a constitution of an 8-entry-full-associative method; however, even in a case of a data processing apparatus provided with a TLB having entry number different therefrom, it is also applicable by extending the bit width of the incrementor 15 (FIG. 1). Further, even in a case of the TLB having a constitution of set-associative method, it is also applicable by using the lower bit of the logical address stored in the PTE-Hi 9 as a tag index.

Moreover, a case in which the operations of search and registration to the TLB are realized by absolute addressing is described; however, those operations can be equally realized by other addressing modes since the address appearing on the IO bus 58 is identical.

Further, a case where the replacement algorithm is FIFO is mentioned; however, even if the algorithm is LRU or a random mode, it is similarly realizable by using the incrementor 15 as a LRU control circuit or a random number generation circuit.

In addition, a case in which registration to the TLB is performed against the entry indicated by the RP 8 is described;

however, it is also possible to write into the entry which the search result satisfies by employing the match signal 20 instead of the output of the decoder 6a for the WL selection on the occasion of writing into the TLB memory section 3.

Further, an example of the TLB shared by data and instruction is shown; however, it is equally applicable even in a case where the data and the instruction are separated. Moreover, with respect to various associative storage device such as an instruction cash and a data cash, or a branch history buffer, they are similarly applicable, realizing the speed processing.

APPLICABILITY IN INDUSTRY

As described above, according to the data processing apparatus and the data processing method of the present invention, even in case of using the associative storage device for the address translation table, the cash memory, the branch history buffer, or the like, and employing the full-associative method when the number of the entry, i.e., the number of the way is large, it is possible to perform searching speedily against the associative storage device.

That is, a data processing apparatus according to Claim 1 of the present invention is one which, employing an associative storage device which performs associative processing by storing plural pairs of first information and second information and outputs, when the specified first information is input, a second information making a pair with the specified first information, comprises: first information holding means for holding the first information; second information holding means for holding the second information; and associative information control means for performing a control to execute the associative processing by inputting the first information held in the first information holding means to the associative storage device, and to hold the second information which makes a pair with the input first information and which is output as the result of the associative processing in the second information holding means when the input first information matches one among the first information stored in the associative storage device. Therefore, by performing reading operation against the specified storage means, i.e., the first information holding means and the second information holding means, associative retrieval is realized against the associative storage device, and processing time can be reduced without a cost increase of the hardware owing to adding of extra instruction or the like. Further, as all the entries in the associative storage device can be searched concurrently all at once, processing time can be considerably reduced as compared with a conventionally offered method in which each entry is subjected to sequential processing. In addition, the apparatus is provided with information pair specifying information holding means for holding information which specifies a pair among pairs of the information stored in the associative storage device, and the above-mentioned associative control means performs a control to execute the associative processing by inputting the first information held in the first information holding means to the associative storage device, and to hold the second information which makes a pair with the input first information and which is output as the result of the associative processing, in the second information holding means when the input first information matches one among the first information stored in the associative storage device, as well as to hold the information which specifies a pair of the matched first information and the second information in the information pair specifying information holding means. Therefore, the processing efficiency can be improved as associative retrieval against the associative storage device is realized by the reading operation against the specified storage means, i.e., the first information holding means, the second information holding means, and the information pair specifying information holding means. Further, the apparatus is provided with central processing unit for controlling the data processing employing the associative storage device, and the above-described associative information control means performs a control as mentioned above in response to inputting/outputting of data by the central processing unit. Therefore, the speedy data processing is possible in such a computer system or the like that is provided with a processor as central processing unit. Moreover, the above-mentioned associative information control means performs a control as described above in response to reading out of information held by the second information holding means, by the central processing unit, thereby achieving the effect above mentioned. Further, the first information holding means and the second information holding means are allocated in the address space administrated by the central processing unit, and inputting/outputting of information is performed by designating information which specifies the allocation position in the address space. Therefore, the effect described above is obtained, and moreover the circuit constitution can be simplified by realizing one of the information holding means only logically.

According to the invention described in Claim 2, the data processing apparatus is one which, employing an associative storage device which performs associative processing by storing plural pairs of first information and second information and outputs, when the specified first information is input, a second information making a pair with the specified first information, comprises: first information holding means for holding the first information; second information holding means for holding second information; associative information control means for performing a control to execute the associative processing by inputting the first information held in the first information holding means to the associative storage device, and to hold the second information which makes a pair with the input first information and which is output as the result of the associative processing, in the second information holding means when the input first information matches one among the first information stored in the associative storage device. Therefore, associative retrieval against the associative storage device is realized by performing the reading operation against the specified storage means, i.e., the first information holding means and the second information holding means, thereby reducing processing time without a cost increase of the hardware owing to adding of extra instruction or the like. Further, the apparatus is provided with information pair specifying information holding means for holding information which specifies a pair among pairs of the information stored in the associative storage device, and the above-mentioned associative information control means performs a control to write the information held in the first information holding means and the information held in the second information holding means to one of the pairs in the associative storage device indicated by the information pair specifying information holding means when writing is performed to the second information holding means. Therefore, associative retrieval against the associative storage device is realized by the reading operation against the specified storage means, i.e., the first information holding means, the second information holding means, and the information pair specifying information holding means, thereby increasing processing efficiency. In addition, the apparatus is provided with central processing unit for controlling the data processing employing the associative storage device, and the above-described associative information control means performs a control as described above in response to inputting/outputting of data by the central processing unit. Therefore, the speedy data processing is possible in such a computer system or the like that is provided with a processor as central processing unit.

Further, the above-described associative information control means performs a control as described above in response to writing of information output by the central processing unit to the second information holding means. Thereby, the effect mentioned above is obtained. Moreover, the first information holding means and the second information holding means are allocated in the address space administrated by the central processing unit, and inputting/outputting of information is performed by designating information which specifies the allocation position in the address space. Therefore, the effect above mentioned is obtained, and moreover the circuit constitution can be simplified by realizing one of the information holding means only logically.

According to the invention described in Claim 7, in the data processing apparatus described in Claim 1 or 2, the associative storage device is an address translation table, and the first information is a logical page address while the second information is a physical page address. Therefore, high speed data processing employing the address translation table can be realized.

According to the invention described in Claim 8, in the data processing apparatus described in Claim 1 or 2, the associative storage device is a cash memory, and the first information is an address while the second information is an instruction or data of operand. Therefore, high speed data processing employing the cash memory can be realized.

According to the invention described in Claim 9, in the data processing apparatus described in Claim 1 or 2, the associative storage device is a branch history buffer, and the first information is an address of branch instruction while the second information is an address of branch destination instruction. Therefore, high speed data processing employing the branch history buffer can be realized.

According to the invention described in Claim 10, there is provided a data processing method which, employing an associative storage device which performs associative specifying information holding step of holding information which specifies a pair among pairs of the information stored in the associative storage device is further provided, and the holding information control step performs a control to hold the information which specifies a pair of the first information and the second information in the information pair specifying information holding step. Therefore, the above-described effect is obtained.

What is claimed is:

1. A data processing apparatus employing an associative storage device which performs associative processing by storing plural pairs of first information and second information and outputting, when a specified first information is inputted, a second information making a pair with the specified first information comprising:

first information holding means for holding the first information;

second information holding means for holding the second information;

associative information control means for performing a control to execute the associative processing by inputting the first information held in the first information holding means to the associative storage device, and to hold the second information which makes a pair with the inputted first information and which is outputted as the result of the associative processing by the second information holding means when the inputted first information matches one of the first information stored in the associative storage device;

information pair specifying information holding means for holding information which specifies a pair among the pairs of the information stored in the associative storage device; and central processing unit for controlling data processing employing the associative storage device;

said associative information control means, in response to reading out of information held by the second information holding means, by the central processing unit, performing a control to execute the associative processing by inputting the first information held in the first information holding means to the associative storage device, and to hold the second information which makes a pair with the inputted first information and which is outputted as the result of the associative processing, in the second information holding means when the inputted first information matches one of the first information stored in the associative storage device, as well as to hold information which specifies a pair of the matched first information and the second information in the information pair specifying information holding means; and said first information holding means and said second information holding means are allocated in an address space administrated by the central processing unit and inputting/outputting of information is performed by designating information which specifies an allocation position in the address space.

2. A data processing apparatus as described in claim 1, wherein said associative storage device is an address translation table, and the first information is a logical page address while the second information is a physical page address.

3. A data processing apparatus as described in claim 1, wherein said associative storage device is a cache memory, and the first information is an address while the second information is an instruction or data of operand.

4. A data processing apparatus as described in claim 1, wherein said associative storage device is a branch history buffer, and the first information is an address of branch instruction while the second information is an address of branch destination instruction.

5. A data processing apparatus employing an associative storage device which performs associative processing by storing plural pairs of first information and second information and outputting, when the specified first information is input, a second information making a pair with the specified first information comprising:

first information holding means for holding the first information;

second information holding means for holding the second information;

associative information control means for performing a control to execute the associative processing by inputting the first information held in the first information holding means to the associative storage device, and to hold the second information which makes a pair with the inputted first information and which is outputted as the result of the associative processing, in the second information holding means when the inputted first information matches one of the first information stored in the associative storage device;

information pair specifying information holding means for holding information which specifies a pair among the pairs of the information stored in the associative storage device; and central processing unit for controlling data processing employing the associative storage device;

said associative information control means, in response to writing of information output by the central processing unit, to the second information holding means, performing a control to write the information held in the first information holding means and the information held in the second information holding means to one of the pairs in the associative storage device indicated by the information pair specifying information holding means; and said first information holding means and said second information holding means are allocated in an address space administrated by the central processing unit, and inputting/outputting of information is performed by designating information which specifies an allocation position in the address space.

6. A data processing apparatus as described in claim 5, wherein said associative storage device is an address translation table, and the first information is a logical page address while the second information is a physical page address.

7. A data processing apparatus as described in claim 5, wherein said associative storage device is a cache memory, and the first information is an address while the second information is an instruction or data of operand.

8. A data processing apparatus as described in claim 5, wherein said associative storage device is a branch history buffer, and the first information is an address of branch instruction while the second information is an address of branch destination instruction.

9. A data processing method employing an associative storage device which performs associative processing by storing plural pairs of first information and second information and outputting, when the specified first information is input, a second information making a pair with the specified first information comprising:

first information holding step of holding the first information;

second information holding step of holding the second information;

associative processing step of making the associative processing executed by inputting the first information held in the first information holding step to the associative storage device;

holding information control step of performing a control to hold the second information which makes a pair with the inputted first information and which is outputted as the result of the associative processing, in the second information holding step when the inputted first information matches one of the first information stored in the associative storage device;

information pair specifying information holding step of holding information which specifies a pair among the pairs of the information stored in the associative storage device; and central processing step of controlling data processing employing the associative storage device;

said holding information control step, in response to reading out of information held in the second information holding step, in the central processing step, performing a control to hold the information which specifies a pair of the first information and the second information which are matched in the associative processing step, in the information pair specifying information holding step; and said first information holding step and said second information holding step are allocated in an address space administrated in the central processing step, and inputting/outputting of information is performed by designating the information which specifies an allocation position in the address space.

10. A data processing method employing an associative storage device which performs associative processing by storing plural pairs of first information and second information and outputting, when the specified first information is input, a second information making a pair with the specified first information comprising:

first information holding step of holding the first information;

second information holding step of holding the second information;

associative processing step of making the associative processing executed by inputting the first information held in the first information holding step to the associative storage device;

holding information control step of performing a control to hold the second information which makes a pair with the inputted first information and which is outputted as the result of the associative processing in the second information holding step when they inputted first information matches one of the first information stored in the associative storage device;

information pair specifying information holding step of holding information which specifies a pair among pairs of the information stored in the associative storage device; and central processing step of controlling data processing employing the associative storage device;

said holding information control step, in response to writing against the second information holding step by the central processing step, performing a control to write information held in the first information holding step and the information held in the second information holding step to one of the pairs in the associative storage device indicated in the information pair specifying information holding step; and said first information holding step and said second information holding step are allocated in an address space administrated in the central processing step, and input/output of information is performed by designating the information which specifies an allocation position in the address space.

* * * * *